US007051198B2

(12) United States Patent
Cabrera et al.

(10) Patent No.: US 7,051,198 B2
(45) Date of Patent: *May 23, 2006

(54) LOGICAL VOLUME MOUNT MANAGER

(75) Inventors: Luis Felipe Cabrera, Bellevue, WA (US); Norbert P. Kusters, Woodinville, WA (US); Peter W. Wieland, Bellevue, WA (US); Robert D. Rinne, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

This patent is subject to a terminal disclaimer.

(21) Appl. No.: 10/705,635

(22) Filed: Nov. 10, 2003

(65) Prior Publication Data

US 2004/0107422 A1 Jun. 3, 2004

Related U.S. Application Data

(63) Continuation of application No. 09/096,772, filed on Jun. 12, 1998, now Pat. No. 6,654,881.

(51) Int. Cl.
G06F 1/24 (2006.01)
G06F 9/00 (2006.01)

(52) U.S. Cl. .................. 713/100; 707/203; 719/321; 719/327

(58) Field of Classification Search ............... 707/203, 707/200; 719/321, 327, 310; 713/1, 2, 100; 710/10; 711/202, 4, 5
See application file for complete search history.

(56) References Cited

U.S. PATENT DOCUMENTS

| 4,633,393 | A | 12/1986 | Rundell ........................ 707/7 |
| 5,032,979 | A | 7/1991 | Hecht et al. ................ 364/200 |
| 5,247,660 | A | 9/1993 | Ashcraft et al. ............ 707/205 |
| 5,276,867 | A | 1/1994 | Kenley et al. .............. 707/204 |
| 5,283,894 | A | 2/1994 | Deran ........................... 707/1 |
| 5,313,617 | A | 5/1994 | Nakano et al. ................ 703/24 |
| 5,408,644 | A | 4/1995 | Schneider et al. ............. 714/1 |
| 5,435,004 | A | 7/1995 | Cox et al. ................... 707/205 |
| 5,465,365 | A | 11/1995 | Winterbottom ............. 395/600 |

(Continued)

FOREIGN PATENT DOCUMENTS

EP    0 485 110 A2    10/1991

(Continued)

OTHER PUBLICATIONS

"The Logical Volume Manager (LVM)", SuSE whitepaper, 2001. pp (31).*

(Continued)

*Primary Examiner*—William Thomson
*Assistant Examiner*—George L. Opie
(74) *Attorney, Agent, or Firm*—Merchant & Gould P.C.

(57) ABSTRACT

A mount manager and supporting data structures enable automatic identification and re-establishment of logical volumes on non-removable storage devices in a computer system across multiple reboots and reconfigurations. The mount manager generates a redirected name for a new logical volume when a unique volume identifier is presented to the mount manager by the operating system. The mount manager stores the unique volume identifier and the associated redirected name in a persistent mount manager data structure. The mount manager establishes a symbolic link between the persistent redirected name and a non-persistent device name used by the operating system. During the boot process, the mount manager uses the data structure entries identified by the unique volume identifiers of the arriving logical volumes to reconstruct the symbolic links so that references to the redirected name will resolve to the correct non-persistent device name.

1 Claim, 6 Drawing Sheets

U.S. PATENT DOCUMENTS

| | | | | |
|---|---|---|---|---|
| 5,511,227 A | 4/1996 | Jones | | 710/9 |
| 5,530,658 A | 6/1996 | Hafner et al. | | 703/6 |
| 5,553,285 A | 9/1996 | Krakauer et al. | | 395/500 |
| 5,568,629 A | 10/1996 | Gentry et al. | | 395/441 |
| 5,579,516 A | 11/1996 | Van Maren et al. | | 707/1 |
| 5,581,760 A | 12/1996 | Atkinson et al. | | 395/700 |
| 5,598,549 A | 1/1997 | Rathunde | | 395/441 |
| 5,623,666 A | 4/1997 | Pike et al. | | 395/616 |
| 5,671,414 A | 9/1997 | Nicolet | | 395/684 |
| 5,675,795 A | 10/1997 | Rawson, III et al. | | 395/652 |
| 5,689,706 A | 11/1997 | Rao et al. | | 395/617 |
| 5,692,128 A | 11/1997 | Bolles et al. | | 395/200.09 |
| 5,724,512 A | 3/1998 | Winterbottom | | 395/200.12 |
| 5,761,526 A | 6/1998 | Sakakura et al. | | 710/1 |
| 5,778,385 A | 7/1998 | Pratt | | 707/200 |
| 5,794,236 A | 8/1998 | Mehrle | | 707/3 |
| 5,802,364 A | 9/1998 | Senator et al. | | 709/325 |
| 5,819,296 A | 10/1998 | Anderson et al. | | 700/79 |
| 5,832,522 A | 11/1998 | Blickenstaff et al. | | 707/10 |
| 5,870,734 A | 2/1999 | Kao | | 707/2 |
| 5,881,285 A | 3/1999 | DeLeeuw | | 709/321 |
| 5,896,546 A | 4/1999 | Monahan et al. | | 710/10 |
| 5,897,661 A | 4/1999 | Baranovsky et al. | | 707/205 |
| 5,931,935 A | 8/1999 | Cabrera et al. | | 710/260 |
| 5,940,849 A | 8/1999 | Koyama | | 711/4 |
| 5,964,886 A | 10/1999 | Slaughter et al. | | 714/4 |
| 5,974,515 A | 10/1999 | Bachmat et al. | | 710/8 |
| 5,990,892 A | 11/1999 | Urbain | | 345/853 |
| 5,991,777 A | 11/1999 | Momoh et al. | | 707/205 |
| 5,996,075 A | 11/1999 | Matena | | 713/200 |
| 6,026,402 A | 2/2000 | Vossen et al. | | 707/9 |
| 6,032,137 A | 2/2000 | Ballard | | 705/75 |
| 6,075,939 A | 6/2000 | Bunnell et al. | | 717/107 |
| 6,076,143 A | 6/2000 | Blumenau | | 711/114 |
| 6,119,131 A * | 9/2000 | Cabrera et al. | | 707/203 |
| 6,151,688 A | 11/2000 | Wipfel et al. | | 709/224 |
| 6,161,111 A | 12/2000 | Mutalik et al. | | 705/42 |
| 6,185,661 B1 | 2/2001 | Ofek et al. | | 711/145 |
| 6,216,211 B1 | 4/2001 | McBrearty et al. | | 711/162 |
| 6,219,693 B1 | 4/2001 | Napolitano et al. | | 709/203 |
| 6,240,511 B1 | 5/2001 | Blumenau et al. | | 713/1 |
| 6,266,740 B1 | 7/2001 | Don et al. | | 711/114 |
| 6,272,571 B1 | 8/2001 | Bachmat | | 710/74 |
| 6,279,033 B1 | 8/2001 | Selvarajan et al. | | 709/217 |
| 6,289,375 B1 | 9/2001 | Knight et al. | | 709/217 |
| 6,311,179 B1 | 10/2001 | Agarwal et al. | | 707/2 |
| 6,311,213 B1 | 10/2001 | Dawson et al. | | 709/217 |
| 6,330,572 B1 | 12/2001 | Sitka | | 707/100 |
| 6,405,284 B1 | 6/2002 | Bridge | | 711/114 |
| 6,421,684 B1 * | 7/2002 | Cabrera et al. | | 707/200 |
| 6,438,744 B1 | 8/2002 | Toutonghi et al. | | 717/137 |
| 6,453,426 B1 | 9/2002 | Gamache et al. | | 714/4 |
| 6,457,139 B1 | 9/2002 | D'Errico et al. | | 714/5 |
| 6,496,839 B1 * | 12/2002 | Cabrera et al. | | 707/203 |
| 6,654,881 B1 * | 11/2003 | Cabrera et al. | | 713/100 |
| 6,665,786 B1 * | 12/2003 | McMichael et al. | | 711/173 |
| 6,974,515 B1 | 12/2005 | Neubert et al. | | 710/8 |
| 2001/0044807 A1 | 11/2001 | Kleiman et al. | | 707/203 |
| 2002/0078335 A1 | 6/2002 | Cabrera et al. | | 713/1 |

FOREIGN PATENT DOCUMENTS

| | | | |
|---|---|---|---|
| EP | 0 482 853 A | 4/1992 | |
| EP | 0 689 125 A2 | 2/1995 | |
| EP | 0 732 653 A2 | 2/1996 | |
| EP | 0 762 267 A2 | 3/1997 | 3/6 |
| EP | 0 767 431 | 4/1997 | 11/14 |
| EP | 0 853 281 | 7/1998 | |
| EP | 1 137 004 A2 | 9/2001 | 20/12 |
| GB | 2297636 A | 8/1996 | 3/6 |
| WO | WO 92/22865 | 12/1992 | |
| WO | WO 97/07461 | 2/1997 | |
| WO | WO 98/15895 | 4/1998 | |

OTHER PUBLICATIONS

Gelb, J.P., "System-Managed Storage", IBM Systems Journal, IBM Corp., Armonk, NY, vol. 28, No. 1, 1989, pp. 77-103.

VERITAS Software Corporation: "VERITAS Volume Manager—Getting Started Guide—Release 3.0.1", 1999, p. 1-71.

A.L. Buck et al., "The Storage Server as Virtual Volume Manager", Proceedings Twelfth IEEE Symposium on Mass Storage Systems, 1993, pp. 79-86.

"XFS: A Next Generation Journalled 64-Bit Filesystem With Guaranteed Rate I/O", http://www-europe.sgi.com/Technology/xfs-whitepaper.html, Silicon Graphics—XFS White Paper, 1-20, (Mar. 15, 1999).

* cited by examiner

FIG. 2B

| REDIRECTED NAME | UNIQUE VOL. ID | |
|---|---|---|
| C: | 994 | ~228 |
| D: | 998 | ~229 |
| ⋮ | ⋮ | |
| Z: | | |
| MMID1 | 990 | ~222 |
| MMID2 | 994 | ~223 |
| MMID3 | 998 | ~224 |

FIG. 2C

| DEVICE NAME | REDIRECTED NAME | UNIQUE VOL. ID | |
|---|---|---|---|
| VOL1 | C: | 994 | ~233 |
| VOL2 | D: | 998 | ~233 |
| ⋮ | ⋮ | ⋮ | |
| | Z: | | |
| VOL3 | MMID1 | 990 | ~233 |
| VOL1 | MMID2 | 994 | ~233 |
| VOL2 | MMID3 | 998 | ~233 |

239 · 235 · 237

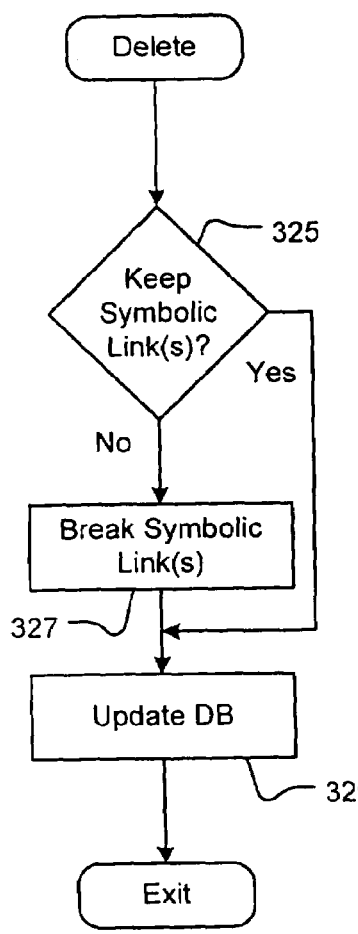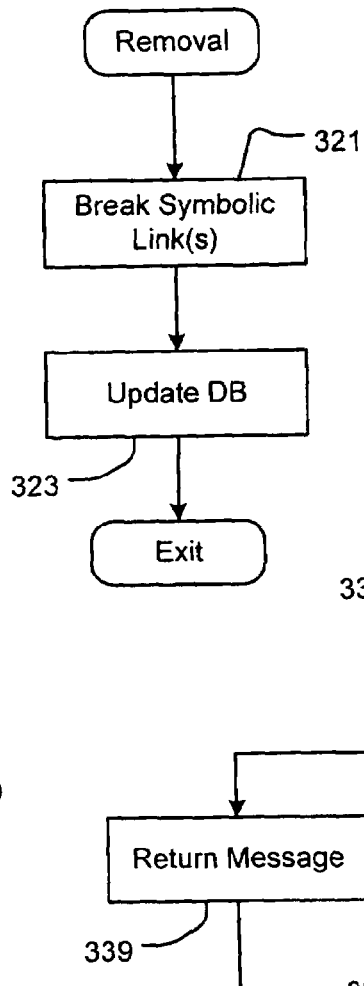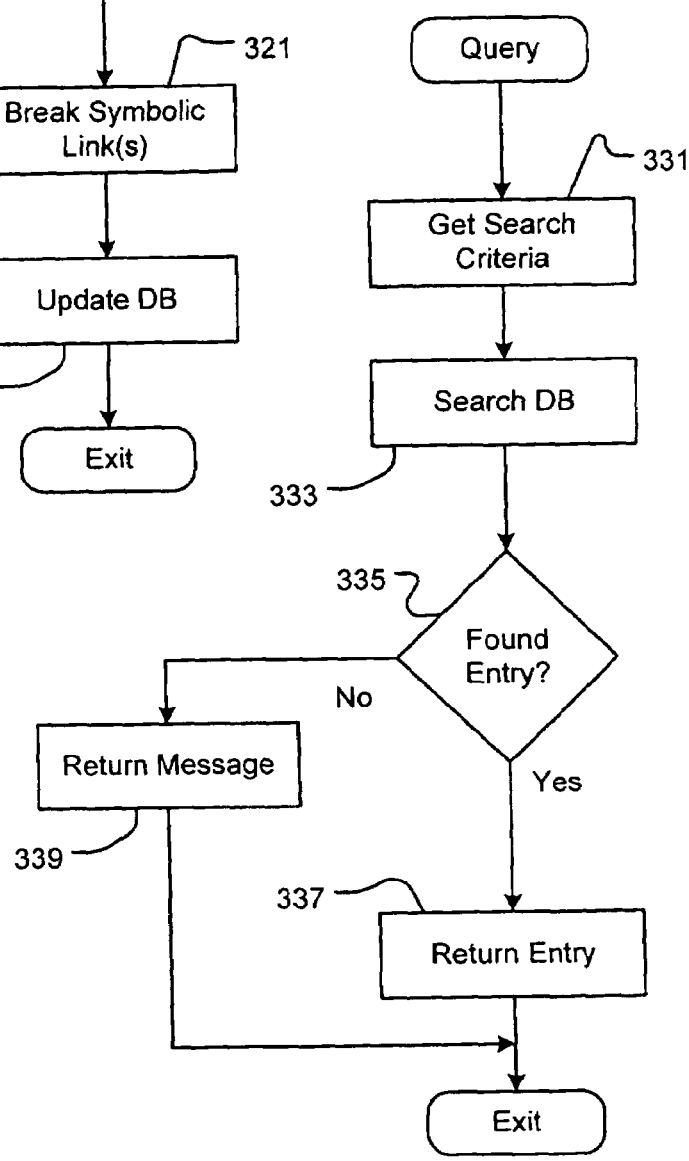

LOGICAL VOLUME MOUNT MANAGER

RELATED APPLICATIONS

This application is a continuation of U.S. patent application Ser. No. 09/096,772, filed Jun. 12, 1998 entitled "Logical Volume Mount Manager," filed Jun. 12, 1998, which is hereby incorporated herein by reference in its entirety. Further, this application is related to co-assigned U.S. patent application Ser. No. 09/096,540, entitled "Persistent Names for Logical Volumes," now U.S. Pat. No. 6,496,839, and U.S. patent application Ser. No. 09/097,061, entitled "Persistent Volume Mount Points," now U.S. Pat. No. 6,119,131, both of which are hereby incorporated herein by reference by their entirety.

FIELD OF THE INVENTION

This invention relates generally to computer storage device configuration, and more particularly to managing logical volumes mounted in a computer system.

BACKGROUND OF THE INVENTION

Most operating systems identify a logical unit of mass storage through a "well-known" and system compatible name which defines an actual physical path to the logical unit, i.e., \device0\partition1\. The operating system then associates a user-friendly name, such as a drive letter, with the well-known name so that the data on the storage device can be easily accessible by higher layers of the operating system and user applications. The higher layers of the operating system and applications assume that the well-known names, and thus the associated user-friendly names, are persistent across boot sessions. In actuality, the names are persistent only as long as the physical configuration of the computer does not change. Persistence cannot be guaranteed because such operating systems assign the well-known names in the order in which the storage devices are detected when booting. When the physical locations of the storage devices change, these operating systems will assign the well-known names to different devices. Therefore, the consistency of name assignments across multiple boot sessions is not preserved under all circumstances, and the higher operating system layers and user applications will be unable to access the data on the devices without modification.

Furthermore, most operation systems assume that only the storage devices found during the boot process will be present during the boot session. Thus, new storage devices added after booting cannot be recognized. This limitation also means that a logical device unit will not be recognized if the underlying storage device is removed and then reinserted during a boot session.

Therefore, there is a need in the art for a operating system that tracks logical device units during and across boot sessions, and provides persistent names despite physical configuration changes.

SUMMARY OF THE INVENTION

The above-mentioned shortcomings, disadvantages and problems are addressed by the present invention, which will be understood by reading and studying the following specification.

A logical volume mount manager is responsible for identifying and tracking logical volumes created from a physical storage device by the operating system, and for determining a redirected name for a logical volume which is used by higher layers of the operating system and user applications. The mount manager builds and maintains a persistent data structure based on a unique volume identifier which identifies the logical volume. Optionally, the mount manager also creates an in-memory data structure as well. Each entry in the data structure(s) consists of the redirected name and the unique volume identifier for a logical volume so that the redirected name persists across boot sessions. Because the operating system addresses a logical volume through a non-persistent device name, the mount manager causes the operating system to create a symbolic link between the device name and the redirected name when the mount manager first identifies the logical volume during a boot session so that the higher layers of the operating system and user applications can access the logical volume through the persistent redirected name.

When the physical configuration of the computer changes, the device name changes but the unique volume identifier does not. The mount manager uses the unique volume identifier to locate the appropriate redirected name in its data structure(s) and causes a new symbolic link to be created with the new device name so that the symbolic link resolves the redirected name to the correct logical volume under all circumstances.

Because the mount manager identifies the logical volume through its unique volume identifier and does not rely on the devices being located in any particular order in the system, or being discovered in any particular order during the boot process, or being present only during the boot process, changes in the physical configuration of the computer between boots, or during a boot session, have no effect on the higher layers of the operating system and user applications which rely on the redirected name. Thus, the level of indirection provided by the mount manager and supporting data structures guarantees that the higher layers of the operating system and user applications will be able to access data on a logical volume for the life of the logical volume without modifications.

The present application describes computer systems, methods, and computer-readable media of varying scope. The mount manager is variously described as causing the processor of a computer to perform certain actions, as a series of steps executed from a computer-readable medium, and in terms of its interaction with objects and other system components in an object-based operating system. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 2B and 2C illustrate mount manager data structures for use in the exemplary embodiment of the invention shown in FIG. 2A;

FIGS. 3A, 3B, 3C and 3D are flowcharts of method to be performed by a computer system according to an exemplary embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular Microsoft Windows NT 5.0 implementation of the invention is described. Finally, in the fifth section, a conclusion of the detailed description is provided.

Hardware and Operating Environment

Figure 1:
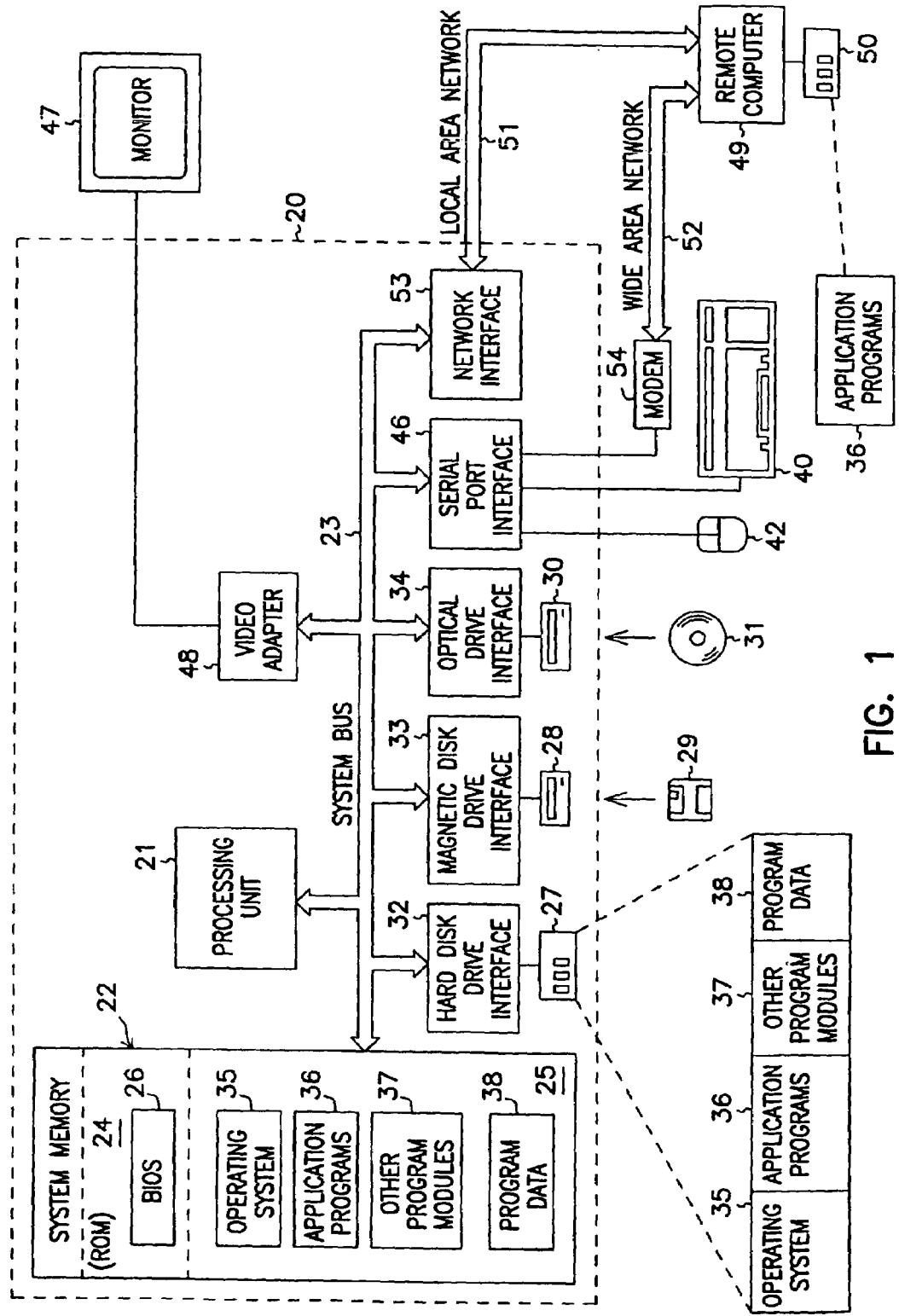
FIG. 1 shows a diagram of the hardware and operating environment in conjunction with which embodiments of the invention can be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20, the local computer; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
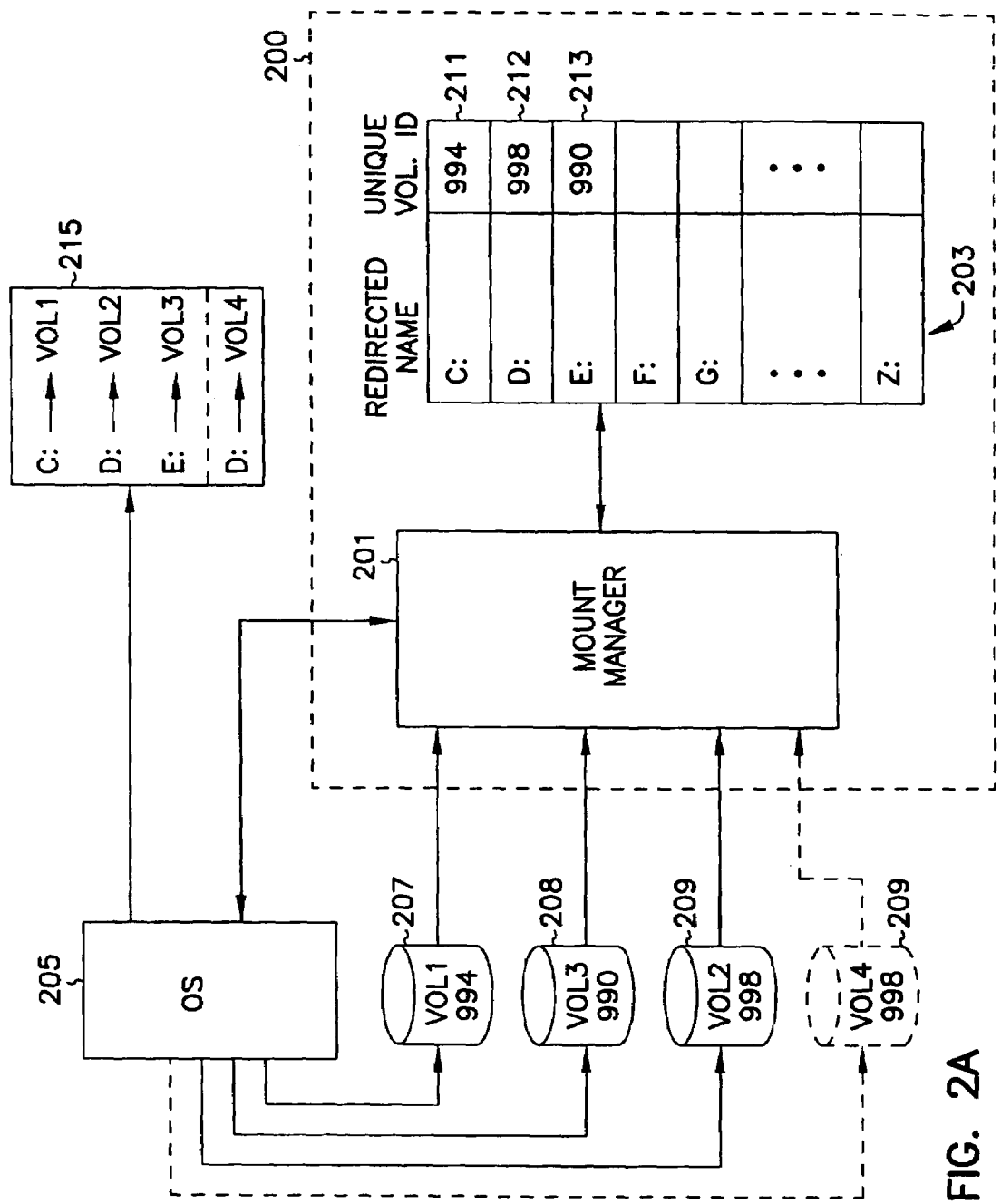
FIG. 2A is a diagram illustrating a system-level overview of an exemplary embodiment of the invention.

A system level overview of the operation of an exemplary embodiment of the invention is described by reference to FIGS. 2A–C. FIG. 2A shows one embodiment of a logical volume mounting subsystem 200 executing in a computer such as local computer 20 or remote computer 49 in FIG. 1. The physical media, such as hard disk drive 27 in local computer 20, contains one or more logical volumes. The process of associating a logical volume with the appropriate underlying physical media is commonly referred to in the art as "mounting" the logical volume on the physical media. The logical volume must be mounted before the data on the physical media can be accessed. The logical volume mounting subsystem 200 shown in FIG. 2A comprises a mount manager 201 and a persistent mount manager data structure 203, and is responsible for associating "redirected" names, used by the higher layers of the operating system and user applications, with mounted logical storage volumes 207, 208 and 209 so that the data on the underlying physical devices can be accessed through the redirected names. In FIG. 2A, the redirected names are represented by drive letters, such as commonly used by personal computer applications. The redirected names are not limited to drive letters as will be readily apparent to one skilled in the art and described in more detail below in conjunction with FIGS. 2B and 2C.

The operating system 205 creates the logical volumes 207–209 from removable or fixed physical media devices, such as hard disk drive 27. Each logical volume is identified by a unique volume identifier, such as 994 for logical volume 207, which is stored on the physical device, or devices, that make up the logical volume, and which is guaranteed to be unique on the particular computer. Each logical volume is also assigned a device name, such as Vol1 for logical volume 207, during the boot process. The device name can change across boot sessions but is unique for a particular boot session.

The mount manager data structure 203 is maintained by the operating system 205 with other configuration data so that it is persistent across boot sessions. The operating system 205 presents each logical volume 207–209 to the mount manager 201 in the order in which the operating system 205 locates each logical volume in the computer when the computer is booted. The mount manager 201 queries each logical volume 207–209 for its device name and unique volume identifier. The mount manager 201 searches the mount manager data structure 203 to find an entry that contains the unique volume identifier for the logical volume 207–209.

As shown in FIG. 2A, the unique volume identifier 991 for logical volume 207 appears in entry 211 in the mount manager data structure 203. Entry 211 also contains a redirected name ("C:") for logical volume 207. Therefore, the mount manager 201 informs the operating system 205 of the association between the redirected name, C:, and the device name, Vol1, for logical volume 207. The operating system 205 creates a logical, symbolic link between the redirected name and the device name, and maintains that link in a symbolic link data structure 215. Similarly, the mount manager 201 causes the operating system 205 to create symbolic links between the device names, Vol3 and Vol2, and the appropriate redirected names, E: and D: respectively, when logical volumes 208, 209 are presented to it.

When a new logical volume is introduced into the system, the mount manager 201 creates an entry in the data structure 203 and a redirected name for the logical volume, and causes the operating system to create the corresponding symbolic link. The redirected name for the logical volume can stored on the physical device, or devices, that make up the logical volume so it can be recalled if queried.

Because the unique volume identifier 998 for logical volume 209 is associated with the redirected name D: in the persistent mount manager data structure 203, logical volume 209 will be always be assigned the same redirected name even if the logical volume 209 is presented to the mount manager 201 after the logical volume 208 which is associated with redirected name E:. The order in which the logical volumes are presented is dependent upon the order in which they are detected by the operating system 205 so the order changes if the underlying physical devices are rearranged in the computer between boots. The device name of the logical volumes also change when the physical configuration changes. Because the mount manager data structure 203 depends on the unique volume identifiers rather than the device names to identify the logical volume, the mount manager data structure 203 ensures consistency between redirected names and logical volumes across boot sessions regardless of the underlying physical configuration of the computer or the order in which the devices are recognized as long as the logical volume is valid.

If a logical volume is permanently removed from the system, the operating system 205 notifies the mount manager 201 which deletes the corresponding entry from the data structure 203 and breaks the symbolic link. However, if the logical volume is only removed temporarily, as illustrated by logical volume 209 in FIG. 2A, the mount manager 201 only breaks the corresponding symbolic link.

As shown in phantom in FIG. 1, if the logical volume 209 is re-introduced in the same boot session, the device name, Vol4, is different because a device name is used only once during a boot session, but the mount manager 201 finds the entry 212 in the data structure 203 based on the unique volume identifier 998. Because the entry is present, the mount manager requests that the operating system 205 re-establish the corresponding symbolic link between logical volume 209 and its redirected name D:.

Thus, the volume mounting subsystem 200 guarantees that symbolic links will always resolve to the correct logical volume, both during a boot session and across multiple boot sessions, during the life of the logical volume.

FIG. 2B illustrates an alternate embodiment of a mount manager data structure 221 in which the redirected name assigned to a logical volume is a mount manager identifier ("persistent mount name") 222, 223, and 224 which is guaranteed to be unique across all computers. Certain logical volumes, illustrated by entries 228 and 229, are also assigned an additional "user-friendly" redirected name, such as a drive letter. The alternate embodiment shown in FIG. 2B is particularly applicable in operating system environments in which the number of user-friendly names for logical volumes is limited because a logical volume without a user-friendly name can be addressed by its persistent mount name 223 and also benefits from the consistency provided by the redirected names of the present invention.

In an alternate embodiment of the logical volume mounting subsystem, the mount manager 201 copies the persistent mount manager data structure into memory so that the time required to mount logical volumes and to detect configuration changes during a boot session is decreased. The in-memory data structure is, by its nature, non-persistent across boot sessions and is recreated during the boot process.

One embodiment of an in-memory mount manager data structure 231 is shown in FIG. 2C. The in-memory mount manager data structure 231 has been created from the persistent mount manager data structure 221 illustrated in FIG. 2B but could also be created from the persistent mount manager data structure 203 shown in FIG. 2A.

Each entry 233 in the in-memory mount manager data structure 231 is composed of three fields: a redirected name field 235, a unique volume identifier field 237, and a device name field 239. The redirected name field 235 and the unique volume identifier field 237 are copied from the persistent mount manager data structure 221 upon system boot. As each logical volume is presented to the mount manager 201, the mount manager 201 stores the boot session device name in the appropriate device name field 239 in the in-memory mount manager data structure 231.

When logical volume 209 is temporarily removed from the system, its device name, Vol2, is deleted from the appropriate entries 233 in the mount manager data structure 231 but the unique volume identifier 998 is maintained in the entries. Thus, when logical volume 209 is re-introduced into the system and assigned the new device name, Vol4, the mount manager 201 is able to identify it as a logical volume that it was previously present, update the data structure 231 appropriately, and re-establish the corresponding symbolic links.

In an alternate embodiment, the in-memory mount manager data structure is an identical copy of the persistent mount manager data structure without the device name field 239.

The system level overview of the operation of an exemplary embodiment of the invention has been described in this section of the detailed description. A mount manager and supporting data structures enable consistent identification and addressing of logical volumes despite physical configuration changes for the life of the logical volumes. While the invention is not limited to any particular arrangement of data in the data structures, for sake of clarity exemplary embodiments of persistent and in-memory data structures have been illustrated and described.

Methods of an Exemplary Embodiment of the Invention

In the previous section, a system level overview of the operation of an exemplary embodiment of the invention was described. In this section, the particular methods performed by a computer executing an exemplary embodiment is described by reference to a series of flowcharts. The methods to be performed by a computer constitutes computer programs made up of computer-executable instructions. Describing the methods by reference to a flowchart enables one skilled in the art to develop such programs including such instructions to carry out the methods on suitable computers (the processor of the computers executing the instructions from computer-readable media). The methods are illustrated in FIGS. 3A–D and are inclusive of the steps or acts required to be taken by the mount manager 201 operating in the environment shown in FIGS. 2A–C.

Figure 3A:
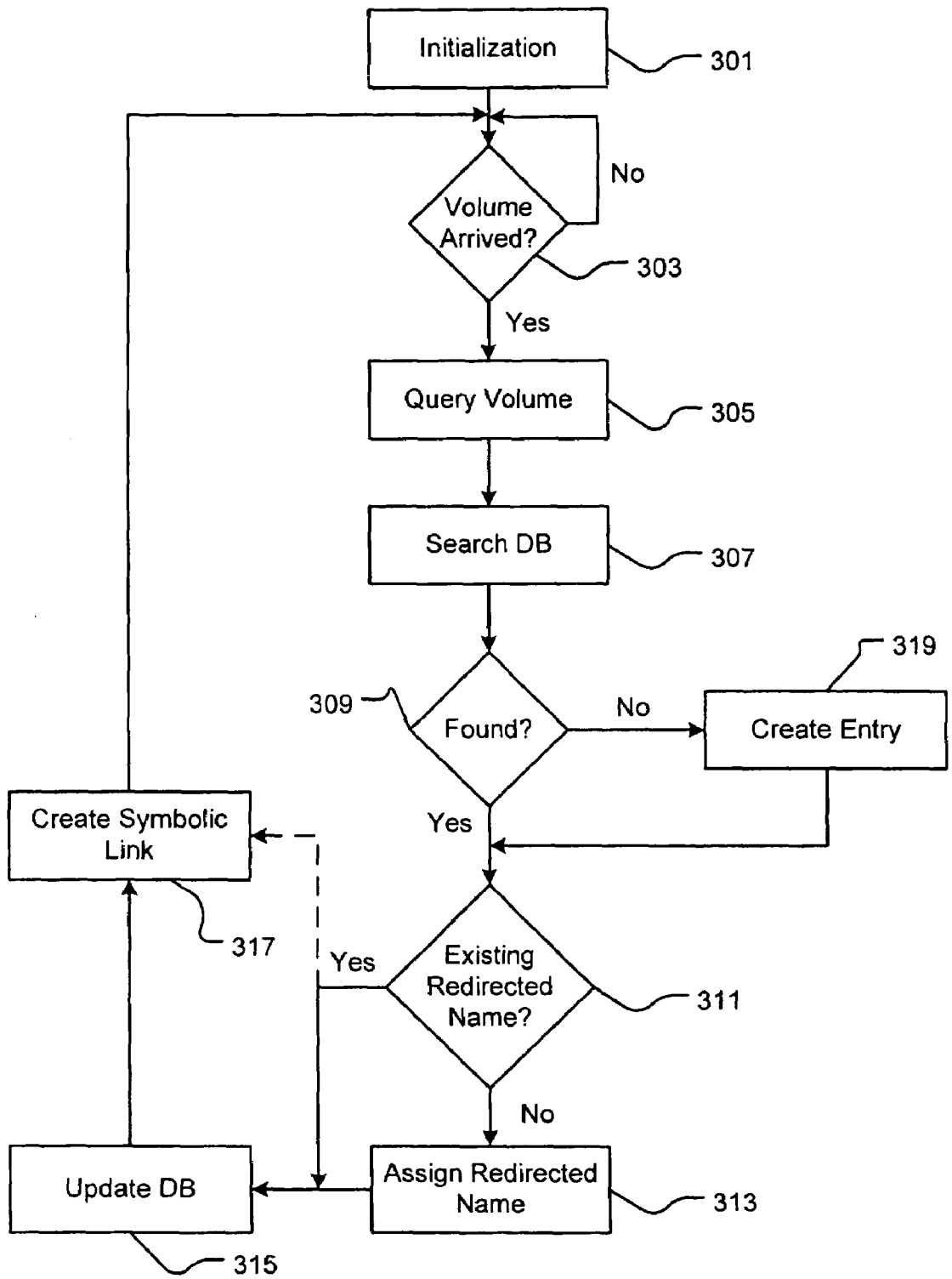

Referring first to FIG. 3A, when the computer is booted, the mount manager 201 creates the in-memory data structure 231 from the persistent mount manager data structure 221 (step 301). Upon initial boot of the computer, the persistent mount manager data structure 221 contains only user-friendly redirected names as no logical volumes have yet been configured in the system. Upon subsequent boots, the persistent mount manager data structure 221 contains user-friendly names, persistent mount names, and unique volume identifiers for the logical volumes that were not known to be permanently deleted from the system when it was shutdown.

After initializing its in-memory data structure 231, the mount manager 201 waits for notification from the operating system 205 that a logical volume has been detected in the computer (step 303). When the notification arrives, either during the boot process or during the boot session, the mount manager 201 queries the volume for its unique volume identifier and its boot session device name (step 305). The mount manager 201 uses the unique volume identifier to search the in-memory data structure 231 for a matching entry (step 307). If a matching entry is found (step 309), the mount manager 201 checks the entry to determine if any redirected name has been previously assigned to the volume (step 311).

If the entry contains a redirected name(s), the mount manager 201 updates the in-memory data structure 221 with the device name at step 315, and causes the operating system 205 to create a symbolic link between the redirected name(s) and the boot session device name (step 317). Thus, the redirected name(s) used by the higher layers of the operating system 205 and user applications are preserved across boot sessions, even though the device names may change when the physical configuration of the computer is modified. In an alternate embodiment in which the in-memory data structure does not contain the device name field, the mount manager 201 skips step 315, as both the in-memory and persistent data structures already contain the correct unique volume identifier and redirected name(s) (illustrated by a phantom logic flow path in FIG. 3A).

When a logical volume is re-introduced into the system, either during a boot or during a boot session, if the entry does not contain redirected name(s) (step 311) as discussed above, then the mount manager 201 queries the logical volume for its "desired" redirected name(s) (step 313) and updates the corresponding entries in the data structures 221, 231 with the device names and/or redirected name(s) as appropriate. The mount manager 201 then requests the creation of the symbolic links (step 317).

If there is no existing data structure entry that matches the unique volume identifier (step 309), the mount manager 201 creates an entry for the logical volume (step 319) by inserting the unique volume identifier in an empty entry. The mount manager 201 creates a persistent mount name the new logical volume (step 313). If requested to do so by the operating system 205, the mount manager 201 also assigns the next available user-friendly name to the new logical volume at step 313. The mount manager 201 informs the logical volume of the assigned redirected name(s) so they can be stored for later use. The mount manager data structures 221, 231 are updated with the redirected name(s) (step 315), and the corresponding symbolic links created (step 317).

The mount manager 201 is also notified by the operating system 205 when a logical volume is temporarily removed from the computer as shown in FIG. 3B. All symbolic links associated with the logical volume are retired (step 321). The mount manager 201 updates its data structures 221, 231 by deleting the device name for the logical volume from all entries associated with the logical volume. The unique volume identifier is maintained in the entries to detect the re-introduction of the logical volume (refer to step 309 in FIG. 3A).

The mount manager 201 also provides for deleting the symbolic links and mount manager data structure entries associated with the logical volume as illustrated in FIG. 3C. When requested to do so by the operating system 205, the mount manager 201 retired the corresponding symbolic links (step 327), and deletes the unique volume identifier, device name, and persistent mount name for the logical volume from all the appropriate entries in the mount manager data structures 221, 231 (step 329). The operating system makes this request when a logical volume is permanently deleted from the system but the operating system can also make the request without deleting the logical volume. However, if the logical volume is being accessed by a higher-layer application, only the data structure entries are modified as described above (step 325). The symbolic link(s) are maintained so that the applications can continue to access the data on the logical volume.

FIG. 3D illustrates the query function of the mount manager 201. The operating system 205 can query the mount manager 201 regarding a mounted logical volume by passing the symbolic link name, the unique volume identifier, or the boot session device name of a logical volume to the mount manager 201 at step 331. The mount manager 201 searches its in-memory data structure, if present, or its persistent data structure (step 333) and returns the corresponding entry if one is found (step 337). If no entry matches the search criteria, the operating system 205 is so informed (step 339). If the device name is used as the search criteria and there is no in-memory data structure, or if the in-memory data structure does not contain the device name, the mount manager 201 uses the symbolic link to determine the redirected name in order to perform the search.

The methods performed by a mount manager of an exemplary embodiment of the invention have been described with reference to a series of flowcharts illustrated in FIGS. 3A–C, including all the steps from 301 until 339 shown therein. In particular, the methods of associating redirected names with logical volumes, and the management of such associations have been described.

Microsoft Windows NT 5.0 Implementation

In this section of the detailed description, a particular implementation of the invention is described that executes as part of the Microsoft Windows NT 5.0 operating system kernel. In the implementation illustrated in FIG. 4, the mount manager 401 and four other kernel modules work together to provide a user with access to data stored on a physical storage device 411 (shown as a fixed hard disk): a plug and play manager 403, an object manager 405, a partition manager 407, and at least one volume manager 409. The mount manager 401 is not limited to use with only devices that adhere to the partition manager and volume manager architectures described below. The mount manager 401 will manage any device which registers with the plug and play manager 403 which has some mechanism for reporting a device name and a unique identifier that is persistent between boots. The partition manager 407 and the volume manager 409 are shown and described for the sake of clarity in understanding the invention.

Figure 4:
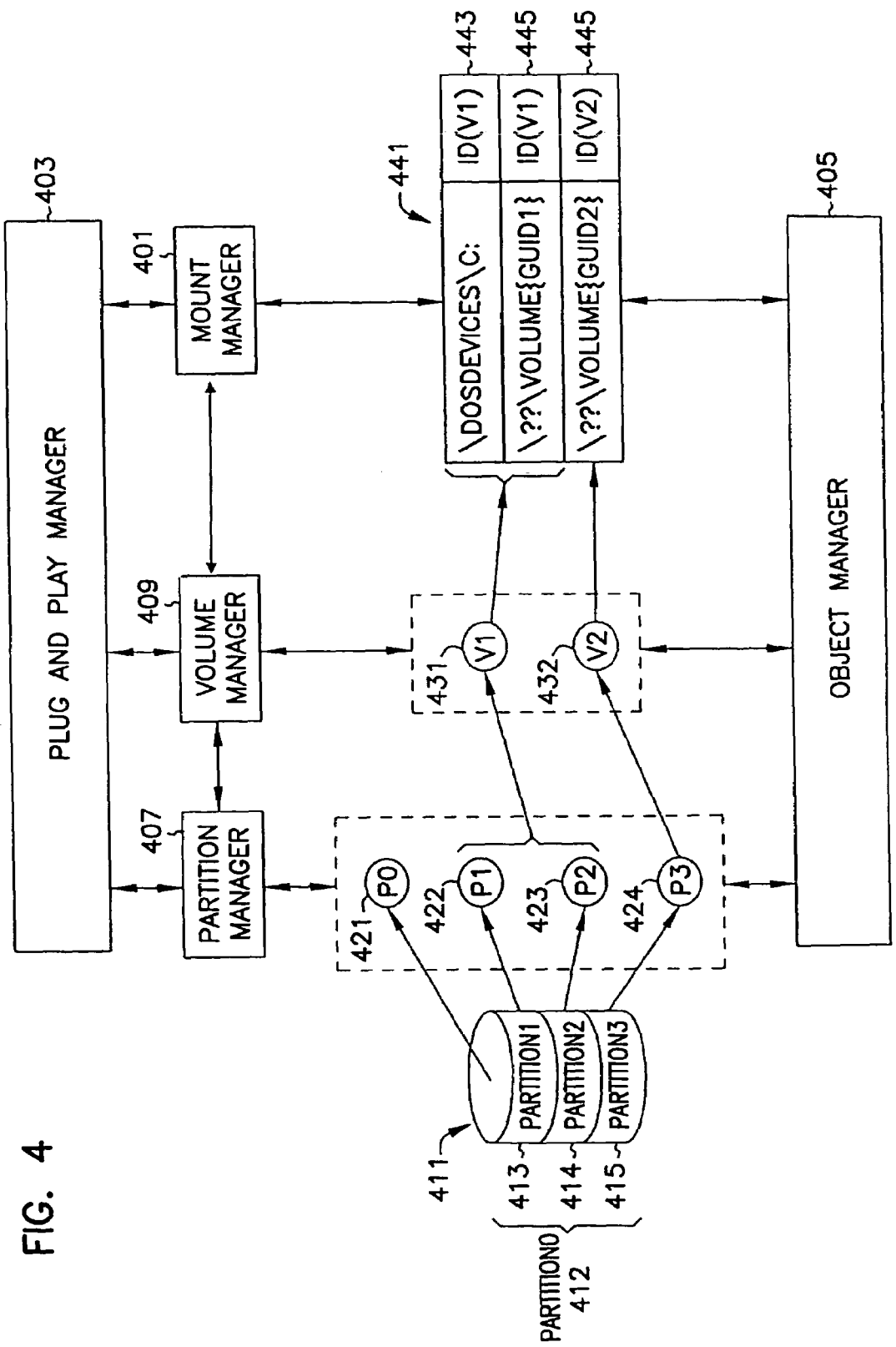
FIG. 4 is a diagram illustrating a particular embodiment of the invention in a Microsoft Windows NT environment.

As described above, the mount manager 401 is responsible for associating redirected names with unique volume identifiers for logical volumes so that higher layers of the operating system and user applications can easily access the data on the logical volume. In the NT 5.0 embodiment, the mount manager 401 persistent data structure is stored in the NT registry. Alternate embodiments in which the persistent data structure is stored in non-volatile memory, such as battery-backed RAM or flash memory, will be readily apparent to one skilled in the art and are contemplated as within the scope the invention. The mount manager 401 also builds an in-memory data structure from the persistent data structure to decrease the time required to react to configuration changes in the system. In FIG. 4, data structure 441 is representative of both the in-memory and persistent data structures.

Because NT 5.0 is an object-based operating system, every device, either physical, logical or virtual, within the system is represented by a device object. The objects are organized into a device hierarchy in a global namespace controlled by the object manager 405. The object manager 405 is also responsible for creating and maintaining symbolic link objects which serve as aliases for named device objects. The mount manager redirected name is represented in the namespace by a symbolic link object which contains the non-persistent device name of the corresponding logical volume. Thus, an "Open" command operating on a redirected name symbolic link object is the same as an "Open" command on the logical volume device object having the device name contained in the symbolic link object.

The partition manager 407 is responsible for handling device objects associated with logical divisions, partitions 412, 413, 414 and 415, of a physical device 411. The partitions 412–415 are created when the physical device 411 is formatted. The partition 412 is the entire physical device 411 while the partitions 413–415 are sub-divisions of the physical device 411. A device driver (not shown) for the physical device 411 "enumerates" corresponding partition device objects 421, 422, 423, and 424 when the computer is booted. The partition manager 407 and at least one volume manager 409 cooperate to create logical volumes from the partitions 413–415. The composition of a logical volume is defined when the physical device is formatted, and can comprise one or more partitions. Additionally, one partition can comprise more than one logical volume. A unique volume identifier for the logical volume is stored in a privileged section of the physical device, or devices, that contain the partitions making up the logical volume The volume manager, or the device driver in the case of a removable device, responsible for the volume device object creates the unique volume identifier.

When the partition manager 407 is initialized, it requests notification from the plug and play manager of all volume managers 409 registered in the system. As each volume manager 409 registers, the plug and play system notifies the partition manager 407 which maintains a list of the volume managers 409 ordered by their arrival in the system.

When the physical device 411 is detected by the plug and play manager 403 upon booting the system, the plug and play manager 403 determines the formatted characteristics of the physical device 411. The plug and play manager 403 loads the appropriate device driver to handle I/O access to the device. The device driver enumerates the partition device objects 421–424 used to access the data. As each partition device object 422–424 not representative of the entire device is enumerated by the device driver, the partition manager 407 "captures" the partition device object 422–424 before the driver registers the object with the plug and play manager 403. The partition manager 407 presents each partition device object 422–424 to the volume managers 409 in the order in which the volume managers 409 arrived in the system. Because each partition device object 424—424 is associated with at least one logical volume, the volume manager 409 responsible for the corresponding logical volume(s) accepts the device object.

When a volume manager 409 has received a sufficient number of partition device objects corresponding to a particular logical volume, the volume manager 409 assigns a device name to the logical volume and enumerates a volume device object 431–432 for the logical volume containing the device name and the unique volume identifier for the logical volume. In the NT 5.0 embodiment, the device name is guaranteed to be unique only during a boot session, while the unique volume identifier is guaranteed to be unique across boot sessions. A counted string is used as the unique volume identifier in the NT 5.0 environment but a fixed length string can be equally applicable in other operating system environments. The counted string is as long as necessary to uniquely identify the device in the computer across multiple boot sessions. The volume device object 431–432 is stored by the object manager 405 in the device hierarchy by its device name. The volume manager 409 informs the plug and play manager 403 of the creation of the volume device object 431–432.

Each volume device object 431–432 is presented to the mount manager 401 by the plug and play manager 403. The mount manager 401 queries the volume device object 431–432 for its device name and unique volume identifier. Because of the indeterminate length of the unique volume identifier, the volume device object returns a byte count along with the string.

The mount manager 401 scans its internal data structure 441 (in-memory or persistent) looking for a matching entry for the unique volume identifier of the volume device object 431–432. If none is found, this particular logical volume is new to the system, so the mount manager 401 assigns it a unique persistent mount name, and creates an entry for the logical volume in the mount manager data structure(s) 441. In the NT 5.0 embodiment, the persistent mount name is based on a 16-byte globally unique identifier (GUID) with following format:

\??\volume{GUID}\ where \??\ designates the entry point in the global namespace device hierarchy for logical volumes and is synonymous with \DosDevices\. The hexadecimal representation of GUID is xxxxxxxx-xxxx-xxxx-xxxx-xxxxxxxxxxxx. A GUID is comparable to the UUID (universally unique identifier) specified by the Open System Foundation. The persistent mount name is generated by a mount manager subroutine called "CreateNewVolumeName." After a new entry is created, or if a matching entry is found, the mount manager 401 requests that the object manager 405 create a symbolic link object to represent the relationship between the device name and the persistent mount name for the logical volume.

In order to facilitate the assignment of user-friendly drive letters to logical volumes, the mount manager data structure(s) 441 contains an entry for each of the twenty-four drive letters assignable to fixed hard disks, i.e., \DosDevices\C:\–\DosDevices\Z:\. The entries are sorted in alphabetical order. Upon the initial boot of the computer, only the logical boot volume is assigned a drive letter (such as \DosDevices\C:\). When a drive letter is requested for a logical volume by the plug and play manager 403 during the initial boot process, the mount manager 401 assigns the next available drive letter by storing the unique volume identifier in the corresponding entry in the data structure(s) 441. The mount manager 401 requests that the object manager 405 create a symbolic link object representing the association between the drive letter and the volume device name.

On subsequent boots, each logical device is assigned its previous drive letter if one is present in the data structure(s) 441. If a new logical device is introduced into the system during the boot process, the plug and play manager 403 must request the assignment of a drive letter. On the other hand, a new logical volume that is introduced during a boot session is automatically assigned the next available drive letter.

The plug and play manager 403 also informs the mount manager 401 when a logical volume will be temporarily removed from the boot session. The mount manager 401 deletes the device names, if present, from the data structure(s) 441. The mount manager 401 also causes the object manager 405 to retire the symbolic link objects relating the volume device name and the drive letter and/or persistent mount name.

If the logical volume is reintroduced into the system during the same boot session, the volume manager will assign a different device name because the device names are guaranteed not to be reused during a boot session, but the unique volume identifier will be the same. Because the mount manager 401 has not deleted the unique volume identifier from the entries in the data structure(s) 441, the mount manager 401 recognizes the logical volume if it is reintroduced and uses the data structure entries to re-create the same symbolic link objects as before so that consistency can be maintained.

If the logical volume is permanently deleted, its unique volume identifier and persistent mount name are also removed from the data structure(s) 441 and any now-empty entries are freed.

The partitions comprising a logical volume can change without deleting the volume if the logical volume is a mirrored volume that has been broken or a striped set that has been rebuilt. Under such circumstances, the device name does not change, but the unique volume identifier associated with the logical volume does. The volume manager 409 so informs the mount manager 401 which updates the data structures to reflect the change in the unique volume identifier.

The mount manager 401 communicates with the logical volume device objects 431–432 through an application program interface (API) having six calls:
QueryDeviceName (pointer to device object);
QueryUniqueId (pointer to volume device object);
QueryDesiredName (pointer to volume device object);
QueryUniqueIdChangeNotify (pointer to volume device object);
LinkCreated (pointer to volume device object); and
LinkDeleted (pointer to volume device object), where the pointer to a device object is passed to the mount manager 401 by the plug and play manager 403.

The interface between the mount manager 401 and volume device objects is identified by a GUID called the "mounted_device_GUID." Any device object that declares support for the mounted_device_GUID must implement at least QueryDeviceName and QueryUniqueId.

QueryDeviceName and QueryUniqueId return the device name and unique volume identifier for the specified volume device object. QueryDesiredName returns a recommended redirected name(s) for the mount manager 401 to use in the event that the mount manager data structure(s) 441 does not yet contain any entries for the specified volume device object. A physical device that supports QueryDesiredName usually stores the desired name(s) in the same privileged area of the physical device as the unique volume identifier.

The mount manager 401 uses QueryUniqueIdChangeNotify to determine if the unique volume identifier for the specified logical volume device object has changed. Such a change is usually due to a change in the location for the volume but other circumstances can also cause the unique volume identifier to change. The mount manager 401 then updates the unique volume identifier in the data structure entries associated with the device name.

LinkCreated and LinkDeleted are used by the mount manager 401 to inform the volume device object of the creation and deletion of the redirected names and the symbolic link objects that reference the volume device object. A physical device that supports LinkCreated and LinkDeleted can use the information to update any redirected name(s) it has internally stored.

The mount manager 401 also provides an API with the plug and play manager 403 for managing the association between unique volume identifiers and the redirected names:
QueryPoints (drive letter/*, unique volume identifier/*, device name/*);
DeletePoints (drive letter/*, unique volume identifier/*, device name/*);
DeletePointsDBOnly (drive letter/*, unique volume identifier/*, device name/*);
CreatePoint (drive letter, device name);
NextDriveLetter(device name);
AutoDriveLetter;
FindFirstVolume; and
FindNextVolume (persistent mount name).

QueryPoints is called by the plug and play manager 403 to retrieve the entry in the mount manager data structure 441 for a logical volume. The plug and play manager 403 specifies the drive letter, the unique volume identifier, or any device name associated with the logical volume as search criteria to be used by the mount manager 401(* is a "wild card" that matches all entries).

DeletePoints causes the mount manager 401 to return the corresponding entries from the data structure 441 and then perform the deletion steps described above to delete all entries and symbolic link objects associated with the volume device object. If a drive letter for a logical volume is explicitly deleted, i.e., not as the result of a wildcard operation, then an indicator associated with the unique volume identifier is set to alert the mount manager 401 that the logical volume is not to be assigned a drive letter if it is re-introduced into the system. DeletePoints is used when a logical volume is permanently deleted from the system or to disassociate a logical volume from some or all of its existing redirected names even though the logical volume itself is still present in the system. DeletePointsDBOnly operates as does DeletePoints but does not delete the symbolic link object(s). DeletePointsDBOnly is used when a logical volume is not deleted or removed and a user application is currently accessing data on the logical volume.

CreatePoint causes the mount manager 401 to assign the specified drive letter to a logical volume which previously had its drive letter deleted through either DeletePoints or DeletePointsDBOnly.

In order to preserve the historical drive letter assignments across boot sessions, the mount manager 401 does not automatically assign a drive letter to a logical volume during the boot process unless the logical volume had previously been assigned a drive letter. Therefore, the plug and play manager 403 uses NextDriveLetter to request that the mount manager 401 assign a drive letter to the logical volume associated with the device name specified in the call. NextDriveLetter returns the current drive letter and an indication of whether a drive letter was assigned. A drive letter cannot be assigned if no drive letter is available or if the logical volume represented by the device name is already assigned a drive letter. The plug and play manager 403 can also use AutoDriveLetter once the historical assignments have been made to request the mount manager 401 assign drive letters to all subsequent logical volumes upon arrival.

Because the mount manager 401 does not necessarily assign a drive letter to a logical volume, the mount manager 401 provides two calls that enumerate the persistent mount names present in the system. The symbolic link objects can then be used to determine the device name of the associated logical volume. FindFirstVolume returns the persistent mount name found in the first entry in the mount manager data structure 441. FindNextVolume returns the persistent mount name in the entry following the entry containing the specified persistent mount name.

Thus, the NT 5.0 mount manager and supporting data structures guarantee the same redirected name(s) will be associated with the same logical volume across any number of boots or reconfigurations as long as the logical volume itself remains valid. The persistence of the redirected names guarantees that I/O commands on a redirected name are resolved through the symbolic links to the current device name for the correct logical volume so that the higher layers of the operating system and user applications do not have to be modified when the underlying physical structure of the computer changes.

CONCLUSION

A logical volume mount manager and supporting data structures have been described. The logical volume mount manager creates persistent redirected names for logical volumes in a computer system to enable symbolic links between the redirected names, which are used by the higher layers of the operating system and user applications, and non-persistent device names that identify the logical volumes to the lower layers of the operating system during a single boot session. Because of the level of indirection provided by the mount manager, the symbolic links can be tom down and rebuilt to point to different device names for the same logical volumes when necessary without requiring modification of the higher levels of the operating system and user applications. Thus, the mount manager and supporting data structures guarantee configuration consistency across boot sessions of the computer and ensure that access through a redirected name is resolved through the symbolic link to the current device name for the correct logical volume.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all operating system and programming environments capable of implementing the mount manager and supporting data structures as described above. Therefore, it is manifestly intended that this invention be limited only by the following claims and equivalents thereof.

We claim:

1. A computer readable medium accessible to a computing system and encoding a computer program for executing a computer process for tracking logical volumes, the computer process comprising:

detecting the creation of a logical volume;

querying the logical volume for a non-persistent device name and a unique volume identifier;

creating a persistent association between the unique volume identifier and a unique mount manager identifier if there is no existing association, the unique mount manager identifier being persistent and unique across all computers; and linking the mount manager identifier to the non-persistent device name.

* * * * *